United States Patent [19]

Arai

[11] Patent Number: 4,902,114
[45] Date of Patent: Feb. 20, 1990

[54] OBJECTIVE LENS FOR AN OPTICAL DISK

[75] Inventor: Norikazu Arai, Hachioji, Japan

[73] Assignee: Konica Corporation, Tokyo, Japan

[21] Appl. No.: 226,378

[22] Filed: Jul. 29, 1988

[30] Foreign Application Priority Data

Jul. 29, 1987 [JP] Japan ................................ 62-187734

[51] Int. Cl.$^4$ ............................................ G02B 13/18
[52] U.S. Cl. ..................................................... 350/432
[58] Field of Search ................................. 350/432–435

[56] References Cited

U.S. PATENT DOCUMENTS

| | | | |
|---|---|---|---|
| 4,027,952 | 6/1977 | Hugues | 350/432 |
| 4,449,792 | 5/1984 | Arai et al. | 350/432 |
| 4,571,034 | 2/1986 | Nakamura | 350/432 |
| 4,641,929 | 2/1987 | Braat | 350/432 |
| 4,671,623 | 6/1987 | Chikuma | 350/432 |
| 4,743,093 | 5/1988 | Oinen | 350/432 |
| 4,765,723 | 8/1988 | Takamura | 350/432 |
| 4,768,867 | 9/1988 | Suda | 350/432 |

Primary Examiner—Scott J. Sugarman
Attorney, Agent, or Firm—Jordan B. Bierman

[57] ABSTRACT

In an objective lens for an optical disk of the type in which focussing is carried out by moving a unit of the entire optical system including a light source and an objective lens, variation of the numerical apertures and deterioration in performance for the focussing are not present, but it is important for reducing the weight of the unit as light as possible to minimize the distance from a light source to an information recording surface while securing an operating distance as required. The lens for that purpose is an aspherical single lens, but it is necessary, for an aspherical shape less affected by a high-order term to be easily fabricated, to make a surface on the light source side an aspherical surface, of which conical coefficient is within a predetermined range.

2 Claims, 4 Drawing Sheets

OBJECTIVE LENS FOR AN OPTICAL DISK

BACKGROUND OF THE INVENTION

1. Field of the Invention

This invention relates to an objective lens for an optical disk, and more particularly to an objective lens composed of a single lens suitable for use with the case where the distance from a light source to an information recording surface is relatively small.

2. Description of the Prior Art

Recently, in the most general optical system used for a recording and reproducing device relative to an information recording medium such as an optical disk, light emitted from a light source 4 is formed into a parallel light by a collimator lens 3 and then condensed on an information recording surface 1 by an objective lens 2, as shown in FIG. 6. In the optical system of this kind, with respect to a surface deflection of an optical disk or the like, focussing is carried out by moving the objective lens 2 in a direction of an optical axis.

This system has a merit in that even if the objective lens is moved, the performance of the optical system remains unchanged, while the system gives rise to a problem in that two lenses, i.e., the objective lens 2 and the collimator lens 3, are required, and therefore the optical system becomes expensive.

On the other hand, in order to reduce the cost, vigorous studies have been progressed of a system in which light from a light source 4 is directly condensed on an information recording surface 1 by an objective lens 2 without using a collimator lens, as shown in FIGS. 7 and 8.

In the system shown in FIG. 7, focussing is carried out by movement of the objective lens 2 alone. The number of apertures and performance of the objective lens 2 are varied because of the movement of the objective lens 2, and therefore, the focussing magnification cannot be made so large. The reference focussing magnification was in the order of $-1/40$ to $-\frac{1}{8}$.

Recently, a compact disk reproducing optical system was reconsidered for the reasons below:

(1) Compactness of an optical system is requested.

(2) Because of an improvement in quality of a compact disk, even if the range within which focussing is possible is narrow, no practical problem occurs. As the result of this reconsideration, it becomes apparent that such an optical system can be used with the reference focussing magnification in the order of $-\frac{1}{4}$.

On the other hand, in the system shown in FIG. 8, focussing is carried out by moving a unit 5 of the entire optical system including a light source 4 and an objective lens 2. In this system, the variation of the numerical apertures and the deterioration of performance due to the focussing are not involved, but it is important to make small the distance from the light source 4 to the information recording surface 1 while securing the operating distance as required in order that the unit 5 may be reduced in weight as light as possible. For this reason, it is necessary to make the focussing magnification as large as possible, $-1/6$ to $-\frac{1}{2}$, as compared with the optical system shown in FIG. 7.

In reducing the cost in these optical systems, the system shown in FIG. 6 has a limit in that the objective lens 2 and the collimator lens 3 are respectively constituted by a single lens.

In the optical system shown in FIGS. 7 and 8, if the objective lens 2 is constituted by two lenses, the number of steps increases in incorporation and adjustment of lenses. So, the optical system shown in FIG. 6 is lower in cost than the others. Therefore, a single lens must be used.

Lenses developed for achieving the above-described object are known from Japanese Patent Laid-Open Publication Nos. 12661/1985, 56314/1986, 118708/1986, 177409/1986, 248014/1986, 252518/1986, 261711/1986 and 10613/1987.

Among those constituted as a single lens described above, Japanese Patent Laid-Open Publication Nos. 126616/1985 and 177409/1986 disclose a lens in which only the light source side is aspherical. It was found that such a lens is poor in the out-of-axis performance, and if in the optical system shown in FIG. 7, the objective lens is driven parallel to the disk to effect tracking, a reproducing signal becomes worsened. In case of the optical system shown in FIG. 8, the focussing magnification need be increased as described previously. However, in such a design, the out-of-axis characteristic becomes greatly worsened, and even when tracking is carried out by moving the unit 5, adjustment of the optical axis of the light source 4 and the objective lens 2 is difficult. Accordingly, in the lens in which one side is aspherical as described, the optical system capable of being used is considerably restricted.

On the other hand, the aspherical shape is expressed by a variety of methods. A method for expression by adding a compensating term represented by the even-number power expansion of the height from the optical axis to a term of a rotational secondary curved surface is most general. Among double aspherical lenses developed for achieving the above-described object, one disclosed in Japanese Patent Laid-Open Publication No. 56314/1986 is given a condition as to the amount of deformation from a reference spherical surface having the radius of curvature of the top at a position in the utmost periphery of an effective diameter of each surface, in which example, the aspherical surface is expressed in the form as described. However, the amount of deformation at the position of the utmost periphery of the effective diameter comprises a complicated total of conical coefficient and aspherical coefficient of each order. In the specific design, the respective coefficients have a large freedom, and even if this condition is fulfilled, there often results in a lens which is large in an aspherical term of high order involving a difficulty in processing and which is large in sensitivity with respect to the parallel eccentricity between the surface on the light source side and the surface opposite to the light source.

The lenses disclosed in Japanese Patent Laid-Open Publication Nos. 118708/1986, 248014/1986, 252518/1986, 261711/1986 and 10613/1987 define the conical coefficient of the surface on the light source side. The compensating term from the secondary curved surface uses the term proportional to the tenth power of the height from the optical axis. However, particularly if the magnification increases, the aspherical amount also increases, and therefore, it is desireable in processing to have an aspherical shape without use of a high-order aspherical term.

DESCRIPTION OF THE INVENTION

This invention is intended to realize a lens having a large focussing magnification suitable for use as an objective lens of an optical system as in FIGS. 7 and 8 without a high-order aspherical compensating term.

An objective lens for an optical disk according to this invention is a double-convex single lens characterized in that both surfaces on the light source and image sides are aspherical surfaces, said aspherical shape being represented by $$X = \frac{ch^2}{1 + \sqrt{1 - (1+k)c^2h^2}} + \sum_{i=1}^{4} A_{2i}h^{2i} \quad (A)$$

where
- x: The distance from a contact plane of an aspherical top to a point on an aspherical surface where the height h form an optical axis
- h: height from an optical axis
- c: curvature of a reference rotational secondary curved surface
- k: conical coefficient of a reference rotational secondary curved surface
- $A_{2i}$: aspherical coefficient of the 2i order (i is an integer of 1 or more)

and the following condition is fulfilled $$|c|f < 0.9 \quad (1)$$

where
f: focal length of a single lens.

This condition is the condition concerning the curvature of the reference rotational secondary curved surface of the lens surface on the light source side.

When the first term of the Equation (A) representative of the aspherical shape is expanded by the even-number power of h, Equation (A) is represented by Equation (B) below:

$$X = (\tfrac{1}{2}c + A_2)h^2 + \{\tfrac{1}{8}(1+k)c^3 + A_4\}h^4 + \{1/16(1+k)^2 c^5 + A_6\}h^6 + \{5/128(1+k)^3 c^7 + A_8\}h^8 + \{\ldots \quad (B)$$

It is understood from this Equation that the contribution from the reference rotational secondary curved surface with respect to the term of $h^{2i}$ is proportional to $(1+k)^{i-1}c^{2i+1}$.

Accordingly, in the case where c is large, $(1+k)^{i-1}c^{2i+1}h^{2i}$ becomes large unless $k \approx -1$. Thus, unless adequate c and k are selected, the high-order term is required as the compensating term from the reference rotational secondary curved surface.

The condition (1) is the condition which requires no high-order term as the compensating term from the reference rotational secondary curved surface. By satisfying with this condition, in case of the expansion as in Equation (B), the contribution of the high-order term can be materially made small, and therefore it becomes possible to easily perform processing of the aspherical shape.

In the lens of this kind, the refracting power on the light source side is large and a degree toward formation of an aspherical surface is strong. Therefore, it is particularly effective that the shape of the surface on the light source side is in accord with the condition (1).

Desireably, the conical coefficient $K_A$ of the surface A on the light source side is satisfied with the following condition.

$$|1 + k_A|c_A^2 f_A^2 < 2 \quad (2)$$

When exceeding the level of this condition, the high-order compensating term is to be required as will be understood from Equation (B) to make it difficult to process the aspherical shape.

DETAILED DESCRIPTION OF THE PREFERRED EMBODIMENTS

Figure 1:
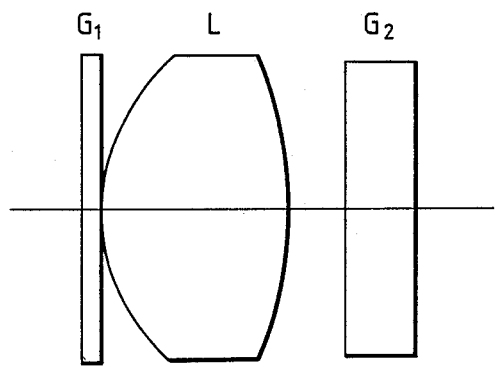
FIG. 1 is a sectional view including a parallel plane plate of an objective lens according to this invention.
Figure 2:
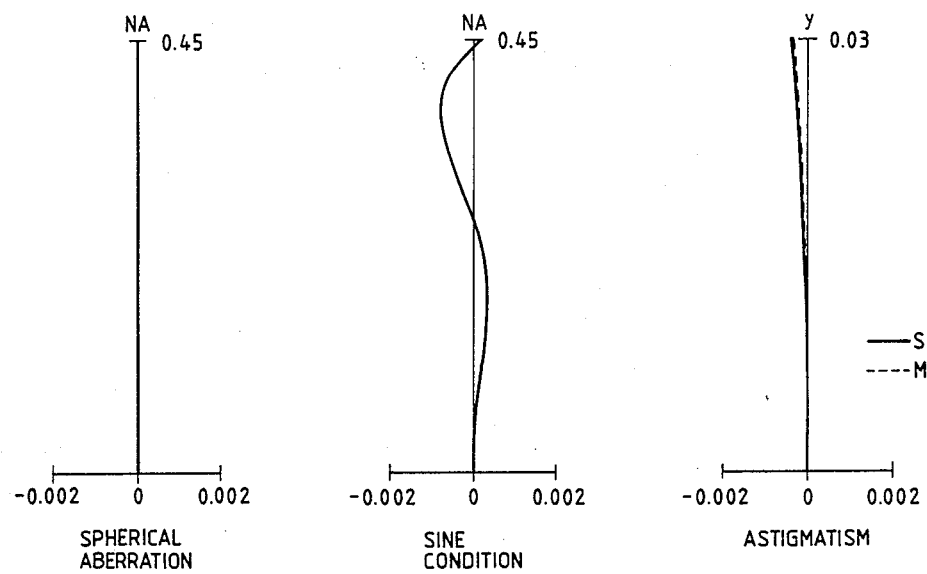
FIGS. 2 to 5 are aberration curves of the first to fourth Examples, respectively.
Figure 3:
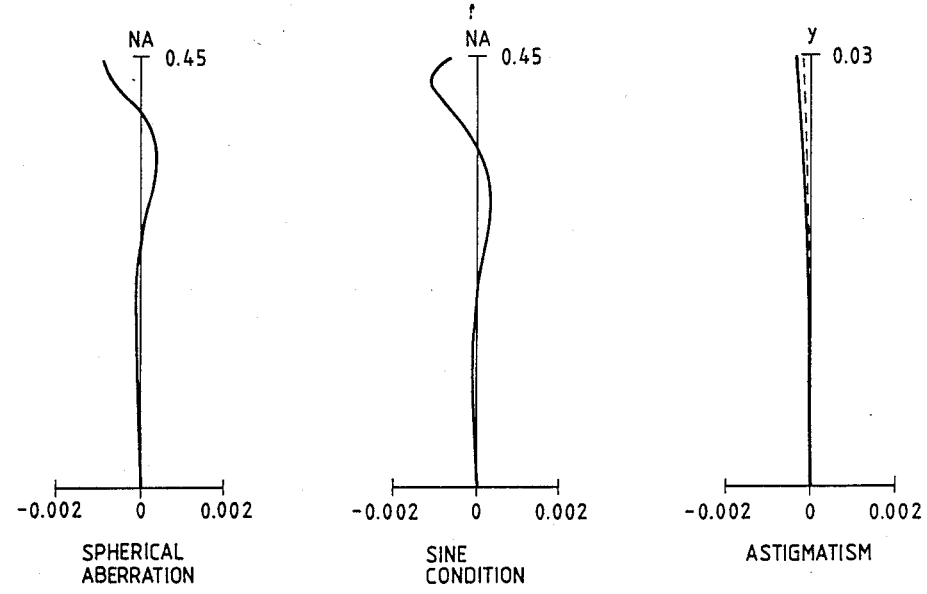
Figure 4:
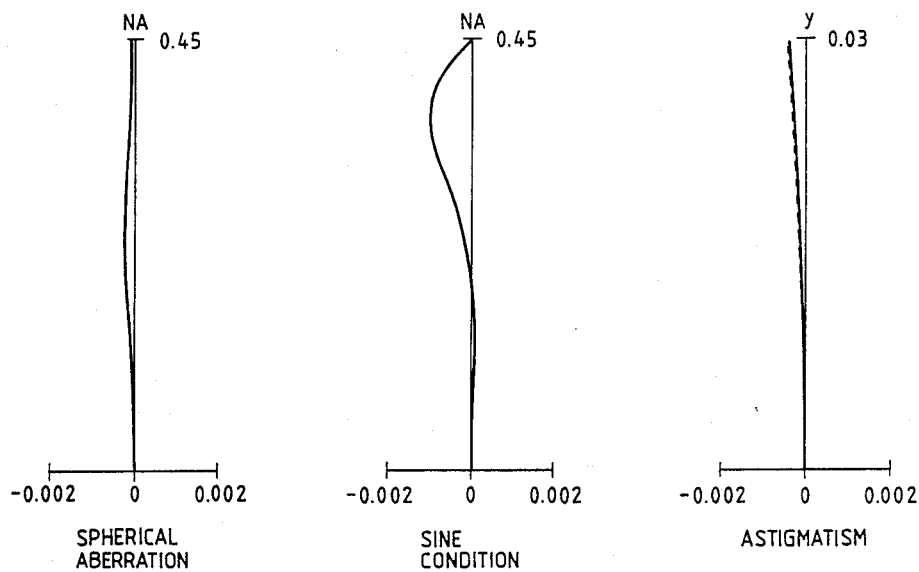
Figure 5:
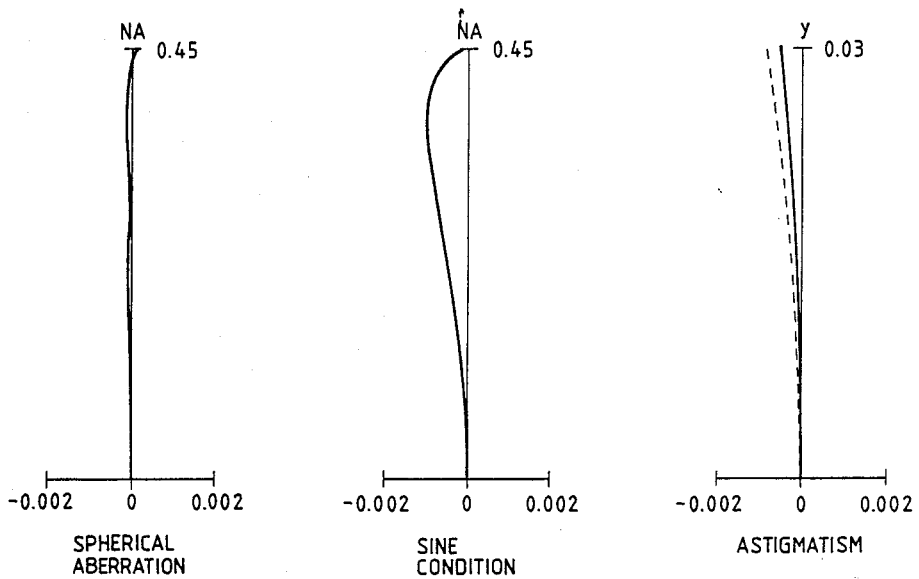

Examples of objective lenses according to this invention will be described hereinafter.

The lens is represented by $$X = \frac{ch^2}{1 + \sqrt{1 - (1+k)c^2h^2}} + \sum_{i=1}^{4} A_{2i}h^{2i}$$

where
- $r_i$: radius of curvature of a reference rotational secondary curved surface of the $i^{th}$ lens surface from the light source side (in case of a spherical surface, radius of curvature of a surface)
- $d_i$: space of the $i^{th}$ lens surface from the light source side
- $n_i$: refractive index of a material of the $i^{th}$ lens from the light source
- $v_i$: Abbe number of the material of the $i^{th}$ lens from the light source side with respect to line d, and the aspherical shape is, as previously mentioned,
- x: The distance from a contact plane of an aspherical top to a point on an aspherical surface where the height h form an optical axis
- h: height from an optical axis
- c: curvature of a reference rotational secondary curved surface (1/r)
- k: conical coefficient of a reference rotational secondary curved surface
- $A_{2i}$: aspherical coefficient of the 2i order (i is an integer of 1 or more)

The radius of curvature R of the top of the aspherical surface is represented by the following formula (C).

$$R = 1/(C + 2A_2) \quad (C)$$

Tables also show values of a parallel plane plate $G_1$ in combination of a cover glass for a semiconductor laser arranged between a light source and an objective lens an a beam splitter, and of a parallel plane plate $G_2$ corresponding to a protective layer of an optical disk arranged between an objective lens L and a focussing point.

EXAMPLE 1

| | | f = 1.0 NA = 0.45 m = −1/5 | | | |
|---|---|---|---|---|---|
| | | $r_i$ | $d_i$ | $n_i$ | $v_i$ |
| 1 | $G_1$ | ∞ | 0.0750 | 1.49000 | 55.0 |
| 2 | | ∞ | 0.0000 | | |
| 3 | L | 2.49988 | 0.8000 | 1.48535 | 55.0 |
| 4 | | −1.06470 | 0.6205 | | |

-continued

| | | f = 1.0 NA = 0.45 m = −1/5 | | | |
|---|---|---|---|---|---|
| 5 | $G_2$ | ∞ | 0.3000 | 1.57000 | 30.0 |
| 6 | | ∞ | | | |

Aspherical coefficient

3rd surface
k = 2.00000
$A_2$ = 5.42965 × $10^{-1}$
$A_4$ = 4.80174 × $10^{-2}$
$A_6$ = −9.47500 × $10^{-2}$
$A_8$ = 0

4th surface
k = −8.83550
$A_2$ = 0
$A_4$ = −6.99783 × $10^{-2}$
$A_6$ = 1.21784 × $10^{-1}$
$A_8$ = −1.03309 × $10^{-1}$
|c A| f = 0.400  |1 + k A| c $A^2$ f $A^2$ = 0.48

EXAMPLE 2

| | | f = 1.0 NA = 0.45 m = −1/3.3 | | | |
|---|---|---|---|---|---|
| | | $r_i$ | $d_i$ | $n_i$ | $v_i$ |
| 1 | L | 1.21751 | 0.8696 | 1.48595 | 55.0 |
| 2 | | −0.94165 | 0.6279 | | |
| 3 | $G_2$ | ∞ | 0.4174 | 1.55000 | 55.0 |
| 4 | | ∞ | | | |

Aspherical coefficient

1st surface
k = 1.10000
$A_2$ = 3.02717 × $10^{-1}$
$A_3$ = −1.53156 × $10^{-1}$
$A_6$ = −7.29564 × $10^{-2}$
$A_8$ = −3.56817 × $10^{-1}$ 2nd surface
k = −0.09000
$A_2$ = 0
$A_4$ = 6.81226 × $10^{-1}$
$A_6$ = −1.27389
$A_8$ = 1.22104
|c A| f = 0.821  |1 + k A| c $A^2$ f $A^2$ = 1.417

EXAMPLE 3

| | | f = 1.0 NA = 0.45 m = −1/5.9 | | | |
|---|---|---|---|---|---|
| | | $r_i$ | $d_i$ | $n_i$ | $v_i$ |
| 1 | $G_1$ | ∞ | 0.3721 | 1.51072 | 64.1 |
| 2 | | ∞ | 0.0000 | | |
| 3 | L | −2.67939 | 0.7294 | 1.48535 | 55.0 |
| 4 | | −1.1440 | 0.5818 | | |
| 5 | $G_2$ | ∞ | 0.3573 | 1.55000 | 30.0 |
| 6 | | ∞ | | | |

Aspherical coefficient

3rd surface
k = −4.50000
$A_2$ = 9.35939 × $10^{-1}$
$A_4$ = 7.22415 × $10^{-2}$
$A_6$ = −8.73158 × $10^{-2}$
$A_8$ = 0

4th surface
k = −9.65000
$A_2$ = 0
$A_4$ = −4.98611 × $10^{-2}$
$A_6$ = 5.11261 × $10^{-2}$
$A_8$ = 0
|c A| f = 0.373  |1 + k A| c $A^2$ f $A^2$ = 0.488

EXAMPLE 4

| | | f = 1.0 NA = 0.45 m = −1/5 | | | |
|---|---|---|---|---|---|
| | | $r_i$ | $d_i$ | $n_i$ | $v_i$ |
| 1 | $G_1$ | ∞ | 1.8484 | 1.51072 | 64.1 |
| 2 | | ∞ | 0.0000 | | |
| 3 | L | 3.08071 | 0.7548 | 1.76591 | 55.0 |
| 4 | | −2.88724 | 0.6073 | | |
| 5 | $G_2$ | ∞ | 0.3697 | 1.55000 | 30.0 |
| 6 | | ∞ | | | |

Aspherical coefficient

3rd surface
k = 2.00000
$A_2$ = 3.78679 × $10^{-1}$
$A_4$ = 1.59021 × $10^{-2}$
$A_6$ = −2.39458 × $10^{-2}$
$A_8$ = −4.41602 × $10^{-2}$ 4th surface
k = 0
$A_2$ = 0
$A_4$ = 1.72231 × $10^{-1}$
$A_6$ = −3.51148 × $10^{-1}$
$A_8$ = 3.58808 × $10^{-1}$
|c A| f = 0.325  |1 + k A| c $A^2$ f $A^2$ = 0.316

Despite the objective lens of this invention uses, as a compensating term from the secondary curved surface with respect to the aspherical surface of the surface on the light source side, only the lower-order term, from sixth power to eighth power, of the height from the optical axis, various aberrations are well corrected as shown in the aberration views of Examples in FIGS. 2 to 5.

Figure 6:
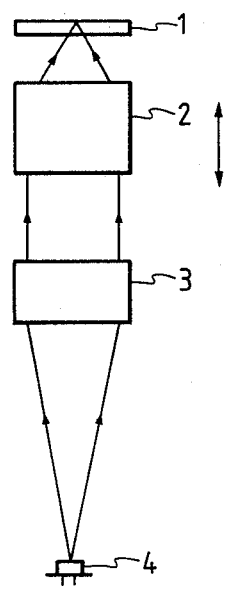
FIG. 6 shows an arrangement of a conventional optical disk optical system.
Figure 7:
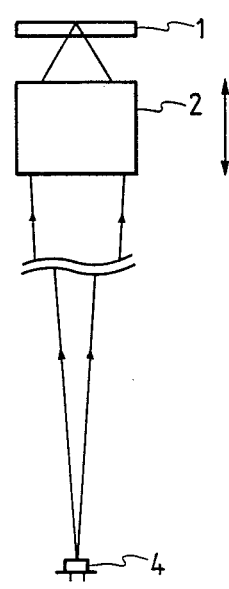
FIGS. 7 and 8 show an arrangement of an optical system using an objective lens according to this invention.
Figure 8:
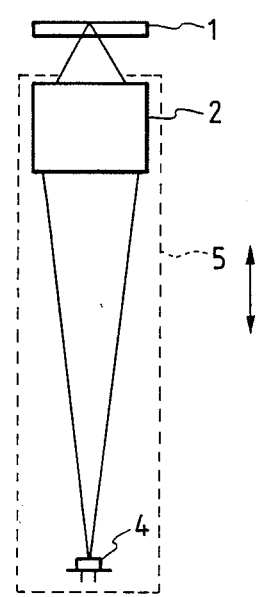

The influence in error in terms of processing can be minimized by the large effective diameter and aspherical amount and by constituting the surface on the light source side whose surface is sharp with an aspherical term of an order as low as possible, thus making it possible to obtain the yield similar to that of the objective lens for infinite conjugation used in the optical system shown in FIG. 6.

What is claimed is:

1. An objective lens for an optical disk comprising a single lens having biconvex surfaces characterized in that both said surfaces are aspherical, and the biconvex surface on the light source side of said lens is represented by $$X = \frac{ch^2}{1 + \sqrt{1 - (1 + k)c^2 h^2}} + \sum_{i=1}^{4} A_{2i} h^{2i}$$

where
x: The distance from a contact plane of an aspherical top to a point on an aspherical surface where the height h forms an optical axis
h: height from an optical axis
c: curvature of a reference rotational secondary curved surface
k: conical coefficient of a reference rotational secondary curved surface
$A_{2i}$: aspherical coefficient of the 2i order (i is an integer of 1 or more)
and fulfills the following condition

|c|f<0.9 where
f: focal length of a single lens.

2. An objective lens for an optical disk according to claim 1 wherein the conical coefficient $K_A$ of the surface A on the light source side satisfies the equation $$|1+k_A|c_A^2 f_A^2 < 2$$

where
- $c_A$: a curvature of a reference rotational secondary curved surface of the surface A
- $f_A$: focal length of the surface A.

* * * * *